United States Patent
Kim et al.

(10) Patent No.: US 8,542,697 B2
(45) Date of Patent: Sep. 24, 2013

(54) METHOD OF TRANSMITTING DATA IN A WIRELESS COMMUNICATION SYSTEM

(75) Inventors: Hak Seong Kim, Anyang-si (KR); Bong Hoe Kim, Anyang-si (KR); Dong Wook Roh, Anyang-si (KR); Dae Won Lee, Anyang-si (KR); Suk Hyon Yoon, Anyang-si (KR); Dong Youn Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 220 days.

(21) Appl. No.: 12/673,438

(22) PCT Filed: Jun. 13, 2008

(86) PCT No.: PCT/KR2008/003346
§ 371 (c)(1),
(2), (4) Date: Feb. 12, 2010

(87) PCT Pub. No.: WO2009/022790
PCT Pub. Date: Feb. 19, 2009

(65) Prior Publication Data
US 2011/0211510 A1    Sep. 1, 2011

Related U.S. Application Data

(60) Provisional application No. 60/955,863, filed on Aug. 14, 2007, provisional application No. 60/972,220, filed on Sep. 13, 2007.

(30) Foreign Application Priority Data

Jun. 13, 2008 (KR) .................. 10-2008-0055497

(51) Int. Cl.
*H04L 12/28* (2006.01)

(52) U.S. Cl.
USPC ............................................. 370/431

(58) Field of Classification Search
USPC ............ 370/310–349, 464–542, 431–439
See application file for complete search history.

(56) References Cited

U.S. PATENT DOCUMENTS

| 5,175,867 A | 12/1992 | Wejke et al. |
| 6,359,923 B1 | 3/2002 | Agee et al. |

(Continued)

FOREIGN PATENT DOCUMENTS

| EP | 1 175 022 | 1/2002 |
| EP | 1 349 292 A2 | 10/2003 |

(Continued)

OTHER PUBLICATIONS

Samsung: "UL reference signal multiplexing", 3GPP TSG RAN WG1 Meeting #47, Riga, Latvia, Nov. 6-10, 2006, R1-063257.

(Continued)

*Primary Examiner* — Obaidul Huq
*Assistant Examiner* — Juvena Loo
(74) *Attorney, Agent, or Firm* — McKenna Long & Aldridge LLP (57) ABSTRACT

A method of transmitting data in a wireless communication system is provided. The method includes transmitting downlink scheduling information regarding downlink radio resource allocation and uplink scheduling information regarding uplink radio resource allocation on a downlink control channel, transmitting downlink data on a downlink data channel according to the downlink scheduling information, and detecting an acknowledgement (ACK)/negative-acknowledgement (NACK) signal for the downlink data from a radio resource exclusively allocated to the ACK/NACK signal. According to the present invention, when an error occurs in a downlink control channel due to deterioration of a channel condition, the error can be promptly handled using an error detection protocol agreed between a user equipment and a base station. Therefore, data can be transmitted with higher reliability.

7 Claims, 5 Drawing Sheets

(56) References Cited

U.S. PATENT DOCUMENTS

| | | |
|---|---|---|
| 6,480,522 B1 | 11/2002 | Hoole et al. |
| 6,621,851 B1 | 9/2003 | Agee et al. |
| 6,628,956 B2 | 9/2003 | Bark et al. |
| 6,804,307 B1 | 10/2004 | Popovic |
| 6,873,606 B2 | 3/2005 | Agrawal et al. |
| 7,106,781 B2 | 9/2006 | Agee et al. |
| 7,149,238 B2 | 12/2006 | Agee et al. |
| 7,430,244 B2 | 9/2008 | Chung et al. |
| 7,433,347 B1 | 10/2008 | Trott et al. |
| 7,469,015 B2 | 12/2008 | Le Nir et al. |
| 7,577,085 B1 | 8/2009 | Narasinham |
| 7,623,441 B1 | 11/2009 | Sampath et al. |
| 7,675,886 B2 | 3/2010 | Agrawal et al. |
| 7,720,168 B2 | 5/2010 | Su et al. |
| 7,724,639 B1 | 5/2010 | Porat et al. |
| 7,724,838 B2 | 5/2010 | Mantravadi |
| 7,773,685 B2 | 8/2010 | Tirkkonen et al. |
| 7,852,806 B2 | 12/2010 | Ahn et al. |
| 7,869,402 B2 | 1/2011 | Yoon et al. |
| 7,881,222 B2 | 2/2011 | Lee et al. |
| 7,889,633 B2 | 2/2011 | Noh et al. |
| 7,894,330 B2 | 2/2011 | Lee et al. |
| 7,920,638 B2 | 4/2011 | Le Nir et al. |
| 7,929,563 B2 | 4/2011 | Wang et al. |
| 7,991,063 B2 | 8/2011 | Khan et al. |
| 8,014,769 B2 | 9/2011 | Lee et al. |
| 8,019,332 B2 | 9/2011 | Lee et al. |
| 8,027,297 B2 | 9/2011 | Kim et al. |
| 8,031,668 B2 | 10/2011 | Wang et al. |
| 8,036,197 B2 | 10/2011 | Pajukoski et al. |
| 8,041,362 B2 * | 10/2011 | Li et al. ................ 455/452.1 |
| 8,050,227 B2 | 11/2011 | Lee et al. |
| 8,116,271 B2 | 2/2012 | Pi |
| 8,155,069 B2 | 4/2012 | Chun et al. |
| 2003/0067907 A1 | 4/2003 | Rezaiifar et al. |
| 2003/0185159 A1 | 10/2003 | Seo et al. |
| 2004/0058687 A1 | 3/2004 | Kim et al. |
| 2004/0133841 A1 | 7/2004 | Lundby et al. |
| 2004/0257978 A1 | 12/2004 | Shao et al. |
| 2005/0068918 A1 | 3/2005 | Mantravadi et al. |
| 2005/0157680 A1 | 7/2005 | Zhang et al. |
| 2005/0180328 A1 * | 8/2005 | Kim et al. ................ 370/236 |
| 2005/0250540 A1 * | 11/2005 | Ishii et al. ................ 455/561 |
| 2005/0265250 A1 * | 12/2005 | Gollamudi et al. .......... 370/252 |
| 2006/0018259 A1 | 1/2006 | Kadous |
| 2006/0023745 A1 | 2/2006 | Koo et al. |
| 2006/0034240 A1 | 2/2006 | Kwak et al. |
| 2006/0034383 A1 | 2/2006 | Su et al. |
| 2006/0035643 A1 | 2/2006 | Vook et al. |
| 2006/0045010 A1 * | 3/2006 | Baker et al. ................ 370/230 |
| 2006/0067413 A1 | 3/2006 | Tsai |
| 2006/0128410 A1 | 6/2006 | Derryberry et al. |
| 2006/0146867 A1 | 7/2006 | Lee et al. |
| 2006/0171342 A1 | 8/2006 | Dateki |
| 2006/0193373 A1 | 8/2006 | Agee et al. |
| 2007/0011550 A1 | 1/2007 | Agrawal et al. |
| 2007/0070944 A1 | 3/2007 | Rinne et al. |
| 2007/0140178 A1 | 6/2007 | Jung et al. |
| 2007/0165739 A1 | 7/2007 | Hottinen et al. |
| 2007/0171849 A1 * | 7/2007 | Zhang et al. ................ 370/310 |
| 2007/0183380 A1 | 8/2007 | Rensburg et al. |
| 2007/0183384 A1 | 8/2007 | Kwak et al. |
| 2007/0211656 A1 * | 9/2007 | Kwak et al. ................ 370/319 |
| 2007/0223618 A1 | 9/2007 | Jeong et al. |
| 2007/0254661 A1 | 11/2007 | Chowdhury et al. |
| 2007/0286261 A1 | 12/2007 | Molev-Shteiman |
| 2008/0013610 A1 | 1/2008 | Varadarajan et al. |
| 2008/0019307 A1 * | 1/2008 | Tenny et al. ................ 370/329 |
| 2008/0032630 A1 | 2/2008 | Kim |
| 2008/0037464 A1 | 2/2008 | Lim et al. |
| 2008/0080634 A1 | 4/2008 | Kotecha et al. |
| 2008/0101211 A1 * | 5/2008 | Rao ................ 370/206 |
| 2008/0151831 A1 | 6/2008 | Khan et al. |
| 2008/0159323 A1 * | 7/2008 | Rinne et al. ................ 370/431 |
| 2008/0182582 A1 | 7/2008 | Bachl et al. |
| 2008/0192696 A1 | 8/2008 | Sachs et al. |
| 2008/0232234 A1 | 9/2008 | McCoy et al. |
| 2008/0232300 A1 | 9/2008 | McCoy et al. |
| 2008/0233964 A1 | 9/2008 | McCoy et al. |
| 2008/0267310 A1 | 10/2008 | Khan et al. |
| 2008/0287155 A1 | 11/2008 | Xu et al. |
| 2008/0304593 A1 | 12/2008 | Khan et al. |
| 2008/0310540 A1 | 12/2008 | Tiirola et al. |
| 2008/0311911 A1 | 12/2008 | Koodli et al. |
| 2009/0045774 A1 | 2/2009 | Rayl et al. |
| 2009/0046672 A1 | 2/2009 | Malladi et al. |
| 2009/0046789 A1 | 2/2009 | Xu et al. |
| 2009/0055703 A1 | 2/2009 | Kim et al. |
| 2009/0073922 A1 * | 3/2009 | Malladi et al. ................ 370/328 |
| 2009/0097447 A1 | 4/2009 | Han et al. |
| 2009/0109906 A1 | 4/2009 | Love et al. |
| 2009/0168922 A1 | 7/2009 | Malladi et al. |
| 2009/0175233 A1 | 7/2009 | Ojala et al. |
| 2009/0196240 A1 | 8/2009 | Frederiksen et al. |
| 2009/0201863 A1 | 8/2009 | Pi |
| 2009/0201904 A1 | 8/2009 | Lee et al. |
| 2009/0238131 A1 | 9/2009 | Montojo et al. |
| 2009/0245187 A1 | 10/2009 | Nam et al. |
| 2009/0259909 A1 | 10/2009 | Luo |
| 2009/0274037 A1 | 11/2009 | Lee et al. |
| 2009/0290597 A1 | 11/2009 | Baumgartner et al. |
| 2009/0303866 A1 | 12/2009 | Li et al. |
| 2010/0220708 A1 | 9/2010 | Mantravadi et al. |
| 2011/0142097 A1 | 6/2011 | Walton et al. |
| 2011/0292900 A1 | 12/2011 | Ahn et al. |
| 2012/0033650 A1 | 2/2012 | Ahn et al. |
| 2012/0087363 A1 | 4/2012 | Jöngren et al. |

FOREIGN PATENT DOCUMENTS

| | | |
|---|---|---|
| EP | 1 389 848 A1 | 2/2004 |
| EP | 1 720 310 A2 | 11/2006 |
| EP | 1 746 855 A2 | 1/2007 |
| EP | 1 784 036 A1 | 5/2007 |
| EP | 1819088 A2 | 8/2007 |
| JP | 2007-028569 | 2/2007 |
| KR | 10-2002-0009079 | 2/2002 |
| KR | 10-2006-0092055 | 8/2006 |
| RU | 2300175 C2 | 5/2007 |
| WO | WO 01/76110 | 10/2001 |
| WO | WO 2004/049613 | 6/2004 |
| WO | WO 2004/051872 A2 | 6/2004 |
| WO | WO 2005/074312 A1 | 8/2005 |
| WO | WO 2005/099103 A1 | 10/2005 |
| WO | WO 2005/114888 A1 | 12/2005 |
| WO | WO 2006/020339 A2 | 2/2006 |
| WO | WO 2006/129749 A1 | 7/2006 |
| WO | WO 2006/107835 A1 | 10/2006 |
| WO | WO 2006/130742 A1 | 12/2006 |
| WO | WO 2006/138337 A1 | 12/2006 |
| WO | WO 2007/015305 A1 | 2/2007 |
| WO | WO 2007/066936 A2 | 6/2007 |
| WO | WO 2007/092258 A1 | 8/2007 |

OTHER PUBLICATIONS

LTE Rapporteur (NTT DoCoMo); "Text proposal for TS 36.300 (Stage 2 TS)", 3GPP TSG RAN WG1 Meeting #48, R1-071251, Feb. 2007.

"3rd Generation Partnership Project; Technical Specification Group Radio Access Network; LTE Physical Layer—General Description (release 8)", 3GPP Draft; R1-071252 36.201 V031, Feb. 2007.

Nokia; "Data-non-associated control signal transmission with UL data", 3GPP TSG RAN WG1 Meeting #48, R1-071000, Feb. 2007.

"LS on physical channel definition", 3GPP TSG RAN WG1 Meeting #49bis, Orlando, USA, Jun. 25-29, 2007, R1-073231.

3rd Generation Partnership Project: Technical Specification Group Radio Access Network; Physical Layer Aspects for Evolved UTRA (Release 7), pp. 1-72, Dec. 6, 2005, XP002436402.

InterDigital Communications Corporation: 'Uplink MIMO SC-FDMA Scheme for EUTRA', 3GPP TSG RAN WG1 #43, pp. 1-6, Nov. 7-11, 2005, R1-051368.

NTT DoCoMo, Fujitsu, Mitsubishi Electric Corporation, NEC, Panasonic, SHARP, Toshiba Corporation: 'Multiplexing Method of Shared Control Channel in Uplink Single-Carrier FDMA Radio Access', TSG-RAN WG1 #42bis, pp. 1-9, Oct. 10-14, 2005, R1-051143.

Samsung: 'Data and Control Channel Multiplexing in SC-FDMA for EUTRA Uplink', 3GPP TSG RAN WG1 Meeting #43, pp. 1-2, Nov. 7-11, 2005, R1-051343.

LG Electronics: 'PHICH duration and signaling', 3GPP TSG RAN WG1 #50, pp. 1-2, Aug. 20-24, 2007.

LG Electronics; "Allocation of ULACK/NACK Index", 3GPP TSG RAN WG1#49, R1-072348, XP050106077, May 2007.

Ericsson; "E-mail summary taking you forward on downlink control signaling", TSG-RAN WG1 #50bis, R1-074369, XP050107884, Oct. 2007.

Motorola; "PHICH Resource Signaling for TDD & FDD", 3GPP TSG RAN #52bis, R1-081286, XP050109724, Apr. 2008.

Motorola; "PHICH Resource Signaling for TDD & FDD", 3GPP TSG RAN #51bis, R1-080433, XP050108952, Jan. 2007.

Gatt et al.; "Indication of PHICH resource for TDD", 3GPP TSG RAN WG1 meeting #52bis, R1-081326, XP 050109752, Mar.-Apr. 2008.

Heesoo Lee et al., Novel Multi-User MIMO Scheme Based on Successive Interference Cancellation, Consumer Electronics, 2007, pp. 1-5, XP031160370.

Motorola: "Search Space Definition for L1/L2 Control Channels", 3GPP TSG RAN #49 bis, Orlando, Florida, Jun. 25-29, 2007, R1-072691.

Mitsubishi Electric: "UE and CEE specific scrambling codes for low complexity blind detection of downlink control signaling", 3GPP TSG RAN WG1 #49 meeting, Kobe, Japan, May 7-11, 2007, R1-072063.

3rd Generation Partnership Project, "Technical Specification Group Radio Access Network, Evolved Universal terrestrial radio access (E-UTRA) Radio Resource control (RRC)", Protocol Specification (Release 8), 3GPP TSG 36.331, V8.0.0, Dec. 2007.

3rd Generation Partnership Project, "Technical Specification Group Radio Access Network, Evolved Universal terrestrial radio access (E-UTRA) Radio Resource control (RRC)", Protocol Specification (Release 10), 3GPP TSG 36.331, V10.2.0, Jun. 2011.

Nokia, Data-non-associated control signal transmission with UL data[online], 3GPP TSG-RAN WG1#48, R1-071000, URL:http://www.3gpp.org/ttp/tsg_ran/WG1_RL1/TSGR1_48/Docs/R1-071000.zip.

"Part 16: Air Interface for Broadband Wireless Access Systems ; P80216Rev2_D0b", IEEE DRAFT; P80216Rev2_D0B, IEEE-SA, Piscataway, NJ USA, vol. 802.16, Jun. 29, 2007, pp. 1-1754, XP017631176, [retrieved on Jun. 29, 2007] p. 1035-1035; figures 319,320.

Bo Goransson et al: "Evolution of WCDMA high speed packet access and broadcast services", Signal Processing Advances in Wireless Communications, 2007—SPAWC 2007—IEEE 8TH Workshop on, IEEE, XX, Jun. 1, 2007, pp. 1-5, XP031189506.

Panasonic: "CQI Feedback Control and content in E-UTRA", 3Gpp Draft; R1-072077, 3rd Generation Partnership Project (3GPP), Mobile Competence Centre; 650, Route Des Lucioles; F-06921 Sophia-Antipolis Cedex; France, vol. RAN W61, no. Kobe, Japan; May 2, 2007, XP050105831.

* cited by examiner

METHOD OF TRANSMITTING DATA IN A WIRELESS COMMUNICATION SYSTEM

This application is a national phase application based on International Application No. PCT/KR2008/003346, filed on Jun. 13, 2008, which claims priority to U.S. Provisional Application No. 60/955,863, filed on Aug. 14, 2007, U.S. Provisional Application No. 60/972,220, filed on Sep. 13, 2007 and Korean Patent Application No. 10-2008-0055497, filed on Jun. 13, 2008, all of which are incorporated by reference for all purposes as if fully set forth herein.

TECHNICAL FIELD

The present invention relates to wireless communications, and more particularly, to a method of transmitting data in a wireless communication system for effectively correcting a system error when an error occurs in a control channel.

BACKGROUND ART

Next generation mobile communication systems have been standardized aiming at providing integrated services and effective interoperations between a wired communication network and a wireless communication network, beyond a simple wireless communication service provided in the conventional mobile communication systems. With the demand on a high-speed, large volume data communication system for processing and transmitting a variety of information such as radio data as well as providing voice-oriented services, there is a need for developing a technique for transmitting large-volume data through the wireless communication network whose capacity is similar to that of the wired communication network.

Hereinafter, a downlink denotes a communication link from a base station (BS) to a user equipment (UE), and an uplink denotes a communication link from the UE to the BS. A data channel denotes a channel for transmitting data. The data channel is classified into a downlink data channel and an uplink data channel. A control channel denotes a channel for transmitting a control signal. Scheduling information regarding the data channel is transmitted through the control channel. The scheduling information generally includes resource assignment information. The resource assignment information provides information regarding resources assigned to the downlink data channel and the uplink data channel.

The UE transmits uplink data through the uplink data channel. Thus, the UE has to receive uplink scheduling information from the BS before transmitting the uplink data. Likewise, the UE has to receive downlink scheduling information from the BS before receiving downlink data.

If an error occurs in the downlink control channel when the downlink scheduling information is transmitted thereon, the UE cannot successfully receive the downlink data since the downlink data channel cannot be known to the UE. In particular, when using a hybrid automatic repeat request (HARQ)-based system, the UE cannot feed back an acknowledgement (ACK)/negative-acknowledgement (NACK) signal. If the ACK/NACK signal cannot be fed back, the BS cannot know whether to transmit new data or to retransmit previous data, which may lead to deterioration in system performance. In addition, if an error occurs in the downlink control channel when the uplink scheduling information is transmitted thereon, the UE cannot transmit uplink data since the uplink data channel cannot be known to the UE.

As such, when the error occurs in the downlink control channel for transmitting scheduling information, the system may operate abnormally. In addition, if the error occurs in the control channel and a time for recovering the error is significantly delayed, a data rate may be decreased. Accordingly, there is a need for a data transfer method in which an error is handled according to a detected error pattern.

DISCLOSURE OF INVENTION

Technical Problem

The present invention provides a method of transmitting data in a wireless communication system, wherein the system is configured to recognize an error of a control channel and a pattern of the error in order to remove or minimize an abnormal operation of the system, thereby maximizing system performance.

Technical Solution

According to an aspect of the present invention, a method of transmitting data in a wireless communication system is provided. The method includes transmitting downlink scheduling information regarding downlink radio resource allocation and uplink scheduling information regarding uplink radio resource allocation on a downlink control channel, transmitting downlink data on a downlink data channel according to the downlink scheduling information, and detecting an acknowledgement (ACK)/negative-acknowledgement (NACK) signal for the downlink data from a radio resource exclusively allocated to the ACK/NACK signal.

According to another aspect of the present invention, a method of transmitting data in a wireless communication system is provided. The method includes receiving downlink scheduling information regarding downlink radio resource allocation and uplink scheduling information regarding uplink radio resource allocation on a downlink control channel, receiving downlink data on a downlink data channel according to the downlink scheduling information, transmitting an acknowledgement (ACK)/negative-acknowledgement (NACK) for the downlink data using a radio resource exclusively allocated for the ACK/NACK signal, and transmitting an uplink multiplexing information indicator indicating whether the ACK/NACK signal and a control signal of a different type are multiplexed.

Advantageous Effects

According to the present invention, when an error occurs in a downlink control channel due to deterioration of a channel condition, the error can be promptly handled using an error detection protocol agreed between a user equipment and a base station. Therefore, data can be transmitted with higher reliability.

MODE FOR THE INVENTION

Hereinafter, exemplary embodiments of the present invention will be described in detail with reference to the accompanying drawings so that this disclosure can be thorough and complete, and will fully convey the concept of the invention to those skilled in the art.

Figure 1:
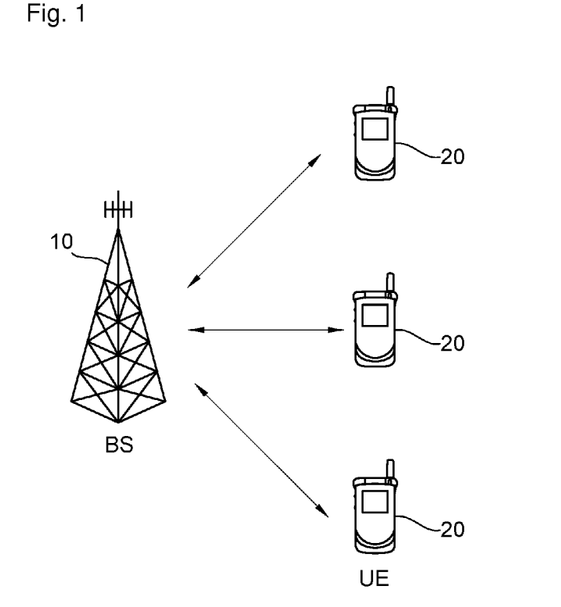
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes a base station (BS) 10 and at least one user equipment (UE) 20. The BS 10 is generally a fixed station that communicates with the UE 20 and may be referred to as another terminology, such as a node-B, a base transceiver system (BTS), an access point, etc. There are one or more cells within the coverage of the BS 10. The UE 20 may be fixed or mobile, and may be referred to as another terminology, such as a mobile station (MS), a user terminal (UT), a subscriber station (SS), a wireless device, etc.

A downlink represents a communication link from the BS 10 to the UE 20, and an uplink represents a communication link from the UE 20 to the BS 10. In the downlink, a transmitter may be a part of the BS 10, and a receiver may be a part of the UE 20. In the uplink, the transmitter may be a part of the UE 20, and the receiver may be a part of the BS 10.

Downlink and uplink transmissions can be made using different multiple access schemes. For example, orthogonal frequency division multiple access (OFDMA) may be used for downlink transmission, and single carrier-frequency division multiple access (SC-FDMA) may be used for uplink transmission.

There is no restriction on the multiple access scheme used in the wireless communication system. The multiple access scheme may be based on code division multiple access (CDMA), time division multiple access (TDMA), frequency division multiple access (FDMA), single-carrier FDMA (SC-FDMA), orthogonal frequency division multiple access (OFDMA), or other well-known modulation schemes. In these modulation schemes, signals received from multiple users are demodulated to increase capacity of the communication system.

Figure 2:
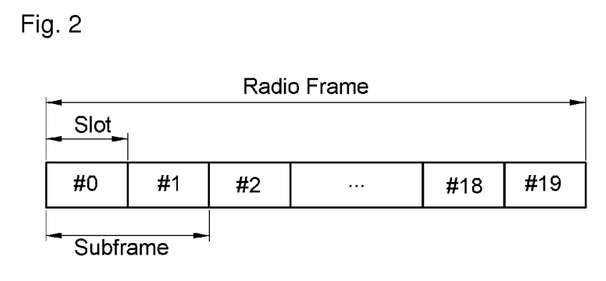
FIG. 2 shows an exemplary structure of a radio frame.

FIG. 2 shows an exemplary structure of a radio frame.

Referring to FIG. 2, the radio frame includes 10 subframes. One subframe includes two slots. The subframe is a basic unit of data transmission. Downlink or uplink scheduling is performed in a subframe unit. One slot may include a plurality of OFDM symbols in a time domain and at least one subcarrier in a frequency domain. One slot may include 7 or 6 OFDM symbols.

The radio frame structure is shown for exemplary purposes only. Thus, the number of subframes included in the radio frame, the number of slots included in the subframe, and the number of OFDM symbols and subcarriers included in the slot can change variously.

Figure 3:
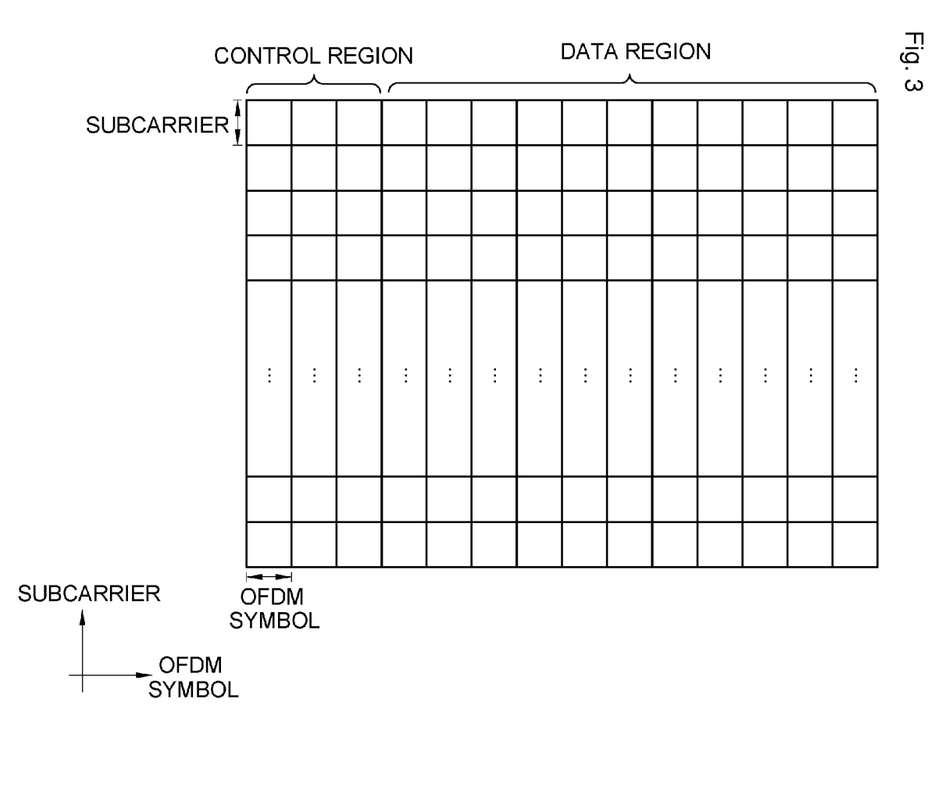
FIG. 3 shows an exemplary structure of a downlink subframe.

FIG. 3 shows an exemplary structure of a downlink subframe.

Referring to FIG. 3, the subframe can be divided into two parts, that is, a control region and a data region. The control region is used to transmit only a control signal and is assigned to a control channel. The data region is used to transmit data and is assigned to a data channel. The control channel transmits the control signal. The data channel may transmit only user data or may transmit both the user data and the control signal. The control channel and the data channel can be configured with one subframe.

The data channel may be a physical downlink shared channel (PDSCH) which is a downlink physical channel for transmitting downlink data. The control channel may be a physical downlink control channel (PDCCH) for transmitting scheduling information. As a downlink control channel, the PDCCH transmits scheduling information (i.e., uplink scheduling information or uplink grant) for a physical uplink shared channel (PUSCH) and scheduling information (i.e., downlink scheduling information or downlink grant) for PDSCH.

From a perspective of one UE, each slot of one subframe can include 7 OFDM symbols in a time domain. Therefore, if one frame consists of two slots, one subframe can include a total of 14 OFDM symbols. If a control signal and data are respectively transmitted using at least one OFDM symbol in one subframe, first 3 OFDM symbols can be assigned to the control channel and the remaining 11 OFDM symbols can be assigned to the data channel. The number of OFDM symbols assigned to the control channel and the data channel in one subframe is not limited thereto.

In a frequency domain, one OFDM symbol can include at least one subcarrier. One subcarrier and one OFDM symbol are also referred to as a resource element. In a downlink scenario, the number of subcarriers included in one OFDM symbols differs from one UE to another. For example, in an FDMA system, the number of subcarriers included in one OFDM symbol is equal to the number of subcarriers in association with a frequency bandwidth assigned to a UE.

Figure 4:
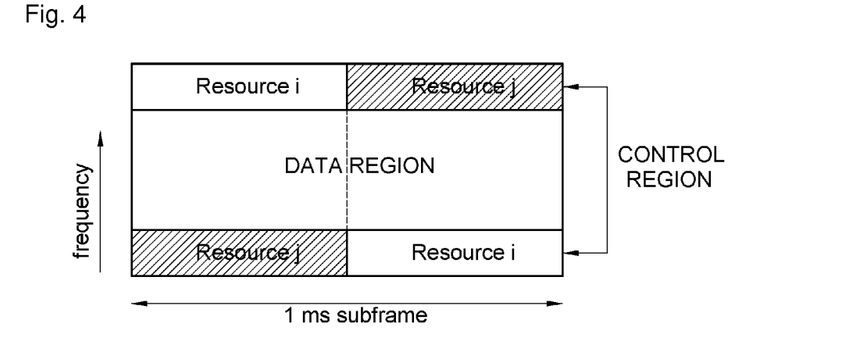
FIG. 4 and FIG. 5 show an exemplary structure of an uplink subframe.
Figure 5:
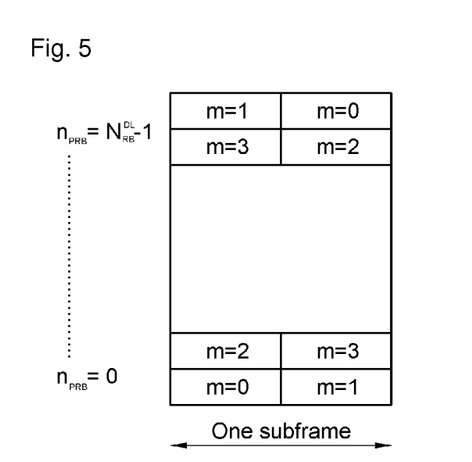

FIG. 4 and FIG. 5 show an exemplary structure of an uplink subframe.

Referring to FIG. 4, the uplink subframe can be divided into two parts, i.e., a control region and a data region. The control region is used to transmit only a control signal and is assigned to a control channel. The control channel may be referred to as a physical uplink control channel (PUCCH). The data region is used to transmit data and is assigned to a data channel. The data channel may be referred to as a physical uplink shared channel (PUSCH). A control signal is transmitted on the control channel. Only user data or both user data and a control signal is transmitted on the data channel. The control channel and the data channel can be configured with one subframe. The control signal includes an acknowledgement (ACK)/negative-acknowledgement (NACK) signal, a channel quality indicator (CQI), a scheduling request (SR), a precoding matrix index (PMI), a rank indicator (RI), etc.

The control signal is carried on the control region. The user data and the control signal may be carried together on the data region. That is, when a UE transmits only the control signal, the control region can be assigned to transmit the control signal. In addition, when the UE transmits both the data and the control signal, the data region can be assigned to transmit the data and the control signal. In an exceptional case, even if only the control signal is transmitted, the control signal may be transmitted in a large amount or the control signal may be not suitable to be transmitted on the control region. In this case, a radio resource can be assigned to the data region to transmit the control signal.

Since the control region and the data region use different frequency bands, frequency division multiplexing (FDM) have been achieved. The control region is located at both edges of a system bandwidth. The data region is located in a center portion of the system bandwidth. However, this is for exemplary purposes only, and thus the arrangement of the control region and the data region is not limited thereto. The locations of the control region and the data region may be changed from each other, and are not limited to the pattern shown in the figure.

The control region and the data region are occasionally changed, and there is no particular boundary between them. Although a boundary is arbitrarily determined as an example in the present invention, various definitions may be used to describe the boundary. Preferably, the BS can share the definition on boundary with a UE by using any possible methods.

Two consecutive slots are assigned to control channel information as a unit (i.e., one subframe). However, the frequency region of one slot assigned to the control channel information is different from that of the other slot assigned to the control channel information. For example, if the frequency region of one slot assigned to the control information is located at one end of the one slot, the frequency region of the other slot assigned to the control information is located at the other end of the other slot. As such, a slot assigned to each UE can be frequency-hopped on a subframe. A frequency diversity gain can be obtained by transmitting one control channel using slots assigned to respective different frequency bands.

In addition, when the number of users is increased to above a maximum number of users that can be accommodated by the aforementioned resource region (i.e., two consecutive slots), another time/frequency resource region is additionally reserved and used. In this case, the additional resource region is located in a diametrically opposite position to the previously used resource region.

Referring to FIG. 5, m denotes an index indicating a resource region to be used for the control channel. In general, resources are reserved and used in a sequential order (i.e., m=0, 1, 2, 3, . . . ). $n_{PRB}$ denotes an index indicating an integrated resource region for controlling the data and control channels. Therefore, when a resource region having an index m=1 and dedicated to the control channel is assigned, a resource block located at $n_{PRB}=n^{PB}_{DL}-1$ in a first slot and a resource block located at $n_{PRB}=0$ in a second slot are collectively reserved and used. Of course, the resource blocks can be used by separate users for each slot.

Figure 6:
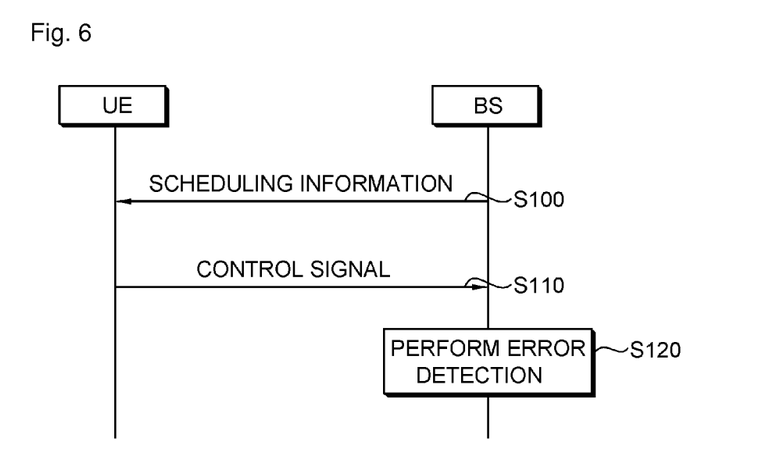
FIG. 6 is a flow diagram showing a communication method between a base station and a user equipment according to an embodiment of the present invention.

FIG. 6 is a flow diagram showing a communication method between a BS and a UE according to an embodiment of the present invention.

Referring to FIG. 6, the BS transmits scheduling information to the UE on a downlink control channel (step S100). The scheduling information may include only downlink scheduling information or may include both uplink scheduling information and the downlink scheduling information. It is assumed that the BS transmits downlink data according to the downlink scheduling information as well.

Upon receiving the downlink scheduling information, the UE transmits to the BS at least one of the following four control signals (step S110). First, the UE can feed back an ACK/NACK signal in response to the downlink data transmitted from the BS. Second, the UE can transmit a CQI periodically or at the request of the BS. Third, the UE can transmit an SR for requesting resource. Fourth, the UE can transmit uplink multiplexing information. The uplink multiplexing information indicates whether a plurality of control signals are multiplexed. The UE can reduce an error detection overhead of the BS by reporting the uplink multiplexing information to the BS. If necessary, channel coding for the uplink multiplexing information can be performed. Preferably, the uplink multiplexing information is transmitted on a data channel when data is transmitted and is transmitted on a control channel when a control signal is transmitted. Alternatively, an independent control channel can be used irrespective of whether uplink data is transmitted or not.

The BS has to promptly determine whether previous data is to be retransmitted or new data is to be transmitted. Therefore, the UE has to properly feed back the ACK/NACK signal at a predetermined time point. Meanwhile, the system is not significantly affected even if the CQI or the SR is less frequently transmitted than the ACK/NACK signal. That is, if the ACK/NACK signal is transmitted most frequently, the UE transmits the ACK/NACK signal except for the case where the ACK/NACK signal is transmitted simultaneously with the CQI or the SR. Of course, the CQI or the SR can be transmitted even when the ACK/NACK is not transmitted. In this case, the CQI or the SR is periodically or non-periodically transmitted with separate parameters.

According to the aforementioned features, the control signals can be transmitted according to 3 types of combinations hereinafter. A first combination has a pattern in which the UE transmits only the ACK/NACK signal. The first combination may be a case where the UE transmits the ACK/NACK signal without retaining transmission of any other control signals or a case where UE chooses to transmit only the ACK/NACK signal with retaining transmission of other control signals. In the latter case, the way of operation may be agreed in advance between the BS and the UE or may be reported by the BS to the UE.

A second combination has a pattern in which the UE transmits the CQI together with the ACK/NACK signal. A third combination has a pattern in which the UE transmits the SR together with the ACK/NACK signal. The combination of control signals transmitted by the UE to the BS may be more various than the aforementioned 3 types of combinations. Detailed descriptions thereof will be omitted for convenience of explanation.

When the UE transmits a plurality of control signals, the BS can assign resources to the plurality of control signals in various manners. For example, unlike other control signals (i.e., a CQI, an SR, etc.), for transmission of the ACK/NACK signal, the BS can assign uplink shared resources and sequences implicitly related to downlink data. That is, to transmit the ACK/NACK signal, a fixed resource can be assigned. Examples of the fixed resource include a location of an uplink subframe, a location of a frequency resource, a location of an SC-FDMA symbol, etc. The fixed resource may be included in an uplink control channel or an uplink data channel. Further, the fixed resource may be predetermined information which is already known to the BS and the UE or may be information reported by the BS to the UE.

On the other hand, for transmission of other control signals, uplink shared resources and sequences not related to the data or the ACK/NACK signal are assigned and used. Therefore, the BS can identify the ACK/NACK signal and the CQI. As such, by applying different resources and sequences to the ACK/NACK signal and other control signals, the BS can identify the control signals. For example, the BS can detect the ACK/NACK signal by performing discontinuous transmission (DTX) detection on the fixed resource region.

For another example, the BS may create a format of the uplink control channel on which the ACK/NACK signal and the CQI are coded together and multiplexed, so that a control signal of the second combination can be supported. For this, the BS can perform signaling on the UE to report additional information regarding coding and multiplexing of the two control signals.

Combinations of control signals transmitted by the UE have been described above. Hereinafter, a channel for transmitting the control signals will be described. An uplink channel for transmitting the control signals may vary according to a presence/absence of uplink scheduling information received by the UE from the BS.

First, if there is no uplink scheduling information received by the UE, the UE transmits the control signals only on the uplink control channel since an uplink data channel is not assigned.

Second, if there is the uplink scheduling information received by the UE, the UE can transmit the control signals together with uplink data on the uplink data channel. The reason of this is to effectively utilize the uplink control channel to which relatively less resources are assigned. Accordingly, a CQI can be transmitted in a more flexible manner, and the UE can transmit the CQI in a greater amount. Therefore, the UE can report accurate channel information to the BS.

The BS detects a transmission error in downlink scheduling information or uplink scheduling information according to an error detection protocol agreed in advance between the UE and the BS (step S120). The error detection is performed by comparing parameters (e.g., a type of a control signal and a channel carrying the control signal, etc. expected to be received by the BS without errors) with parameters actually received by the BS from the UE. For example, if a control signal(s) of the first combination is received when the BS expects to receive a control signal of the second combination, it can be determined that a transmission error is detected in scheduling information. A method of detecting the transmission error in scheduling information will be described below in detail.

Figure 7:
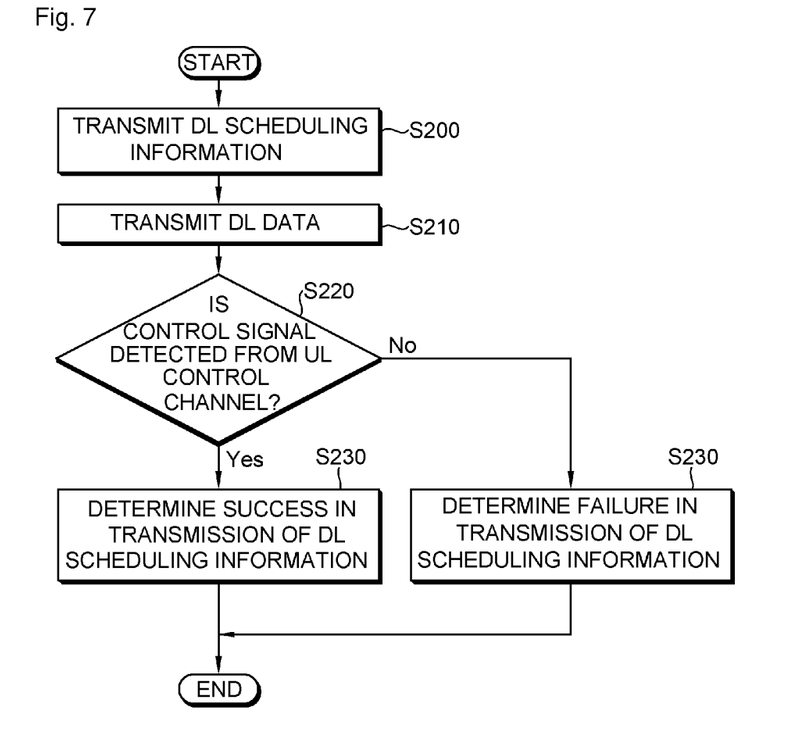
FIG. 7 is a flowchart showing a method of detecting a transmission error in scheduling information according to an embodiment of the present invention.

FIG. 7 is a flowchart showing a method of detecting a transmission error in scheduling information according to an embodiment of the present invention. FIG. 7 shows a case where a BS transmits only downlink scheduling information and downlink data regarding the downlink scheduling information, and uplink scheduling information is not transmitted.

Referring to FIG. 7, the BS transmits the downlink scheduling information to a UE (step S200). The BS transmits the downlink data to the UE according to the downlink scheduling information (step S210).

The BS determines whether an expected control signal to be received through an uplink control channel is detected (step S220). The uplink control channel may also be referred to as a PUCCH. Since the BS does not transmit the uplink scheduling information to the UE, the UE transmits the control signal through the uplink control channel instead of an uplink data channel. Accordingly, the BS determines whether the expected control signal is received through the uplink control channel.

The BS can know a combination type of the expected control signal among the aforementioned first to third combinations. This is because the BS knows when to receive an ACK/NACK signal, a CQI, and an SR. For example, if a reception time point of the ACK/NACK signal coincides with that of the CQI, the BS can predict that a control signal of the second combination is transmitted from the UE.

Since the BS transmits the downlink data, the ACK/NACK signal indicating a success/failure of downlink data reception must be included in the control signal combination. Therefore, the BS can detect the expected control signal on the uplink control channel by performing DTX detection on a reference signal corresponding to the ACK/NACK signal. A modulation scheme used in such a detection process is referred to as coherent modulation. The coherent modulation can restore even relatively weak signals since modulation and demodulation can be performed using the reference signal. In the coherent modulation, constellation of a transmission signal (i.e., the ACK/NACK signal) can be identified according to a predetermined reference signal.

A control signal(s) of the second (or third) combination is also considered to be detected in addition to the ACK/NACK signal. Not to consider the second (or third) combination, it may be agreed between the UE and the BS that the UE transmits only the ACK/NACK signal while retaining transmission of other control signals. In this case, the UE and the BS have to know in advance about a protocol for retaining transmission of a specific control signal. For example, if a control signal of the third combination is used, the UE can transmit the ACK/NACK signal while retaining transmission of the SR.

Alternatively, another method may also be considered in which a resource region and a sequence are separately assigned to the ACK/NACK signal and the CQI on an uplink control channel in order to separately detect each control signal.

If the ACK/NACK signal is detected from the uplink control channel as a result of the DTX detection, the BS determines that there is no transmission error in the downlink scheduling information (step S230). Otherwise, if the ACK/NACK signal is not detected from the uplink control channel as a result of DTX detection, the BS determines that there is a transmission error in the downlink scheduling information (step S240).

For example, since the BS transmits downlink data, the ACK/NACK signal is necessarily expected to be received by the BS from the UE. Of course, according to a transmission time point, the expected control signal may be a signal of the second combination (i.e., the ACK/NACK signal+the CQI). However, if the UE cannot successfully receive the downlink scheduling information, the UE cannot successfully receive downlink data information since resource assignment information regarding the downlink data and other control signals cannot be known to the UE. Accordingly, the UE cannot feed back the ACK/NACK signal to the BS, and thus the BS cannot detect the ACK/NACK signal. Since the ACK/NACK signal cannot be detected from the uplink control channel, the BS determines that there is a fundamental error in the downlink control channel.

Herein, unsuccessful detection of the ACK/NACK signal does not necessarily mean that other controls signals are not detected. For example, if a control signal of the second combination is expected by the BS, the UE transmits the CQI through the uplink control channel, and thus the BS can detect the CQI from the uplink control channel.

Accordingly, error detection can be simply achieved when the BS compares the expected control signal with an actual signal obtained from the result of DTX detection performed by the BS. In addition, delay caused by an abnormal operation of the system can be minimized.

Figure 8:
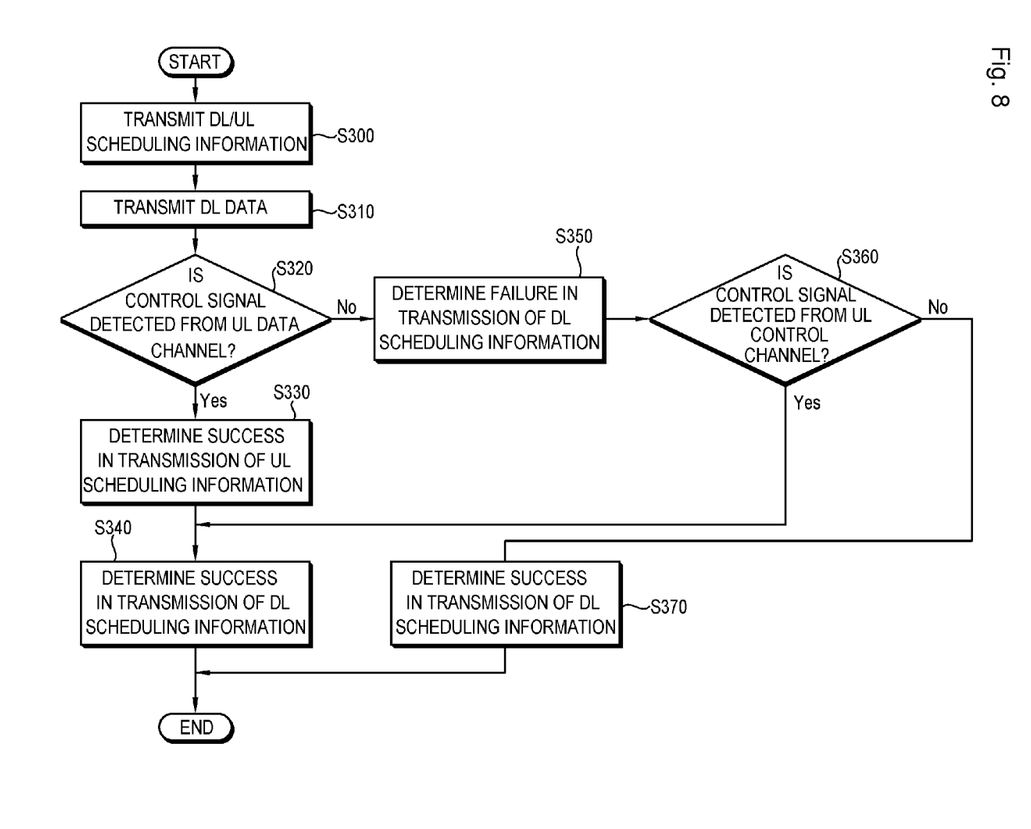
FIG. 8 is a flowchart showing a method of detecting a transmission error in scheduling information according to another embodiment of the present invention.

FIG. 8 is a flowchart showing a method of detecting a transmission error in scheduling information according to another embodiment of the present invention. FIG. 8 shows a case where a BS transmits both downlink scheduling information and uplink scheduling information.

Referring to FIG. 8, the BS transmits the downlink scheduling information and the uplink scheduling information to a UE (step S300). Both the downlink scheduling information and the uplink scheduling information are transmitted on a downlink control channel. The downlink control channel can be referred to as a PDCCH. An error in the downlink control channel is traced by observing an indication about the downlink control channel.

According to an embodiment, The uplink scheduling information includes a downlink transmission indicator indicating whether the downlink scheduling information is transmitted or not. By using the downlink transmission indicator, the UE can know whether to receive the downlink scheduling information. If the downlink scheduling information is not successfully received even when the downlink transmission indicator indicates that the downlink scheduling information has been transmitted, the UE can easily know that an error occurs in the downlink control channel.

According to another embodiment, the BS may transmit an error indicator (or a downlink control channel configuration indicator) indicating whether an error occurs in the downlink scheduling information as a portion of the downlink control channel. That is, the BS accurately reports to the UE a structure of a control channel to be transmitted in uplink, and thus an error detection overhead is reduced when scheduling information is transmitted.

The BS transmits downlink data to the UE according to the downlink scheduling information (step S310). Since the BS transmits downlink data, it can be known that an ACK/NACK signal corresponding to the downlink data is included in an expected control signal. In addition, according to a transmission time point of a control signal (e.g., a CQI and an SR), the BS can know whether the expected control signal is only the ACK/NACK signal (i.e., a first combination signal) or, the ACK/NACK signal and the CQI (i.e., a second combination signal) or, the ACK/NACK signal and the SR (i.e., a third combination signal).

Meanwhile, since the BS transmits the uplink scheduling information, it is expected that the UE transmits uplink data according to the uplink scheduling information. As such, the UE transmits the uplink data together with the expected control signal by using a resource allocated according to the uplink scheduling information.

When the expected control signal is transmitted together with the uplink data on the uplink data channel, the BS detects the uplink data by using a demodulation reference signal (DM-RS). The DM-RS is a reference signal used to estimate a channel for data demodulation.

First, to detect a transmission error in uplink scheduling information, the BS determines whether the expected control signal is detected from the uplink data channel (step S320). The expected control signal includes the ACK/NACK signal. Thus, the BS performs DTX detection on a reference signal for the ACK/NACK signal on the uplink control channel. In this case, to further facilitate the detection of the expected control signal, the BS may predetermine locations of resource regions and sequences used for control signals.

If the expected control signal is detected from the uplink data channel, the BS determines that the uplink scheduling information is successfully transmitted (step S330). This is because, if the UE cannot successfully receive the uplink scheduling information, the UE cannot know information regarding the uplink data channel, and thus it can be presumed that the UE may transmit the expected control signal not on the uplink data channel but on the uplink control channel. Therefore, if the expected control signal is detected, it can be determined that the BS has successfully transmitted the uplink scheduling information.

In addition, since the expected control signal is detected, it can be determined that the downlink scheduling information has successfully transmitted (step S340). This is because, if the ACK/NACK is included in the expected control signal, it is certain that the UE has successfully received the downlink scheduling information and thus has successfully decoded the downlink data according to the downlink scheduling information.

Returning back to the previous step, if the expected control signal is not detected from the uplink data channel, the BS determines that the transmission of the uplink scheduling information has failed (step S350). As described above, if the UE has not transmitted the expected control signal together with the uplink data on the uplink data channel, it means that the UE cannot know about the uplink data channel. In addition, if the UE cannot know about the uplink data channel, it means that the UE has failed to receive the uplink scheduling information.

Next, to detect the transmission error in the downlink scheduling information, the BS determines whether the expected control signal is detected from the uplink control channel (step S360). The expected control signal includes the ACK/NACK signal. Thus, the BS performs DTX detection on a reference signal for the ACK/NACK signal on the uplink control channel. This is because it is presumed that the UE transmits to the BS the ACK/NACK signal corresponding to the downlink data.

If the expected control signal is detected from the uplink control channel, the BS determines that the downlink scheduling information is successfully transmitted (step S340).

Otherwise, if the expected control signal is not detected from the uplink control channel, the BS determines that the transmission of downlink scheduling information has failed (step S370). This is because, if the downlink scheduling information is successfully transmitted, at least the ACK/NACK signal for the downlink data has to be transmitted. However, since no control signal has been detected, the BS can determine that transmission of the uplink scheduling information has failed.

As such, the transmission error in the uplink scheduling information can be detected by considering which uplink channel the expected control signal is transmitted on. In addition, the transmission error in the downlink scheduling information can be detected by considering whether the ACK/NACK signal is included in the expected control signal.

Hereinafter, a pattern of errors generated in scheduling information will be described in detail. The errors occur because an expected control signal and an uplink channel on which the expected control signal is transmitted are different from a control signal actually transmitted by a UE and an uplink channel on which the control signal is transmitted.

Table 1 below shows a pattern in which a transmission error occurs in downlink scheduling information in a case where the BS transmits to the UE only the downlink scheduling information and downlink data without transmission of uplink scheduling information.

TABLE 1

| | pattern | A1 | A2 | A3 |
|---|---|---|---|---|
| A | ACK/NACK signal | ○ | ○ | ○ |
| | CQI | X | ○ | X |
| | SR | X | X | ○ |
| | Uplink Data | X | X | X |
| | Uplink Channel | Control Channel | Control Channel | Control Channel |
| | pattern | B1 | B2 | B3 |
| B | ACK/NACK signal | X | X | X |
| | CQI | X | ○ | X |

TABLE 1-continued

| | | | |
|---|---|---|---|
| SR | X | X | O |
| Uplink Data | X | X | X |
| Uplink Channel | — | Control Channel | Control Channel |

Referring to Table. 1, a pattern A shows the type of expected control signals (i.e., an ACK/NACK signal, a CQI, and an SR), uplink data, and channel on which the uplink data and the expected control signals are transmitted, when there is no transmission error in the downlink scheduling information. A pattern B shows the type of actual control signals, uplink data, and channel on which the uplink data and the control signals are transmitted, when there is transmission error in the downlink scheduling information. An actually transmitted (or expected) control signal is indicated by 'O'. A non-actually transmitted (or non-expected) control signal is indicated by 'X'.

In a pattern A1, the BS transmits the downlink scheduling information, and the expected control signal is as in the first combination. Upon the occurrence of the transmission error in the downlink scheduling information, the UE operates according to a pattern B1. That is, no control signal is transmitted by the UE. In this case, the BS performs DTX detection on a reference signal for the ACK/NACK signal on the uplink control signal to detect the transmission error of the downlink scheduling information.

In a pattern A2, the BS transmits the downlink scheduling information, and the expected control signal is as in the second combination. That is, the pattern A2 is a case where the BS receives the ACK/NACK signal and the CQI simultaneously. Upon the occurrence of the transmission error in the downlink scheduling information, the UE operates according to a pattern B2. That is, the UE actually transmits only the CQI through the uplink control channel. Likewise, the BS performs DTX detection on a reference signal for the ACK/NACK signal on the uplink control signal and detects the transmission error in the downlink scheduling information.

In a pattern A3, the BS transmits the downlink scheduling information, and the expected control signal is as in the third combination. That is, the pattern A3 is a case where the BS receives the ACK/NACK signal and the SR simultaneously. Upon the occurrence of the transmission error in the downlink scheduling information, the UE operates according to a pattern B3. That is, the UE actually transmits only the SR on the uplink control channel.

If the UE has to transmit the control signal as in the third combination, no problem arises when the UE transmits the two signals. However, if only one control signal is needed to be transmitted, it is preferable to determine which one has the priority over the other one.

This is because, if it is agreed between the UE and the BS that the SR is prior to the ACK/NACK signal in case of the third combination, no error can be found in the pattern B3. Therefore, it if preferable to determine that the ACK/NACK signal has a priority over the SR.

The BS performs DTX detection on a reference signal for the ACK/NACK signal on the uplink control channel. If the ACK/NACK signal is not detected, it can be determined that there is the transmission error in the downlink scheduling information.

Table 2 below shows a pattern in which a transmission error occurs in both downlink scheduling information and uplink scheduling information in a case where the BS transmits both the downlink scheduling information and the uplink scheduling information.

TABLE 2

| | pattern | A4 | A5 | A6 |
|---|---|---|---|---|
| A | ACK/NACK signal | O | O | O |
| | CQI | O | X | X |
| | SR | X | O | X |
| | Uplink Data | O | O | O |
| | Uplink Channel | Data Channel | Data Channel | Data Channel |

| | pattern | B4 | B5 | B6 |
|---|---|---|---|---|
| B | ACK/NACK signal | X | X | X |
| | CQI | O | X | X |
| | SR | X | O | X |
| | Uplink Data | X | X | X |
| | Uplink Channel | Control Channel | Data Channel | — |

Referring to Table. 2, for a case A and a case B, the BS can detect a transmission error of scheduling information by using a method of performing DTX detection on a DM-RS on an uplink data channel and a method of performing DTX detection on a reference signal for the ACK/NACK signal on an uplink data channel and an uplink control channel.

When there is no transmission error in the downlink scheduling information and the uplink scheduling information like a pattern A4, the expected control signal is as in the second combination, and the expected uplink channel is a data channel. However, when a transmission error is detected in both the uplink and downlink scheduling information, similarly to a pattern B4, only the CQI is actually transmitted on the uplink control channel.

To detect the transmission error in the uplink and downlink scheduling information, the BS detects first an uplink data channel by using the DM-RS, and then detects the ACK/NACK signal, by performing DTX detection, from a corresponding area when data is detected. Since the ACK/NACK signal cannot be detected with the pattern A4, the BS can determine that there is the transmission error in the uplink scheduling information.

Next, the BS detects the ACK/NACK signal from the uplink control channel. For effective detection of a transmission error in scheduling information, the UE and the BS determine which signal has a priority in transmission between the CQI and the ACK/NACK signal when a control signal of the second combination is transmitted. It will be assumed herein that the ACK/NACK signal has a priority over the CQI. That is, the CQI is dropped. In this case, since the expected control signal is the ACK/NACK signal, the BS can detect the transmission error in the scheduling information by detecting only the ACK/NACK signal. However, since the ACK/NACK signal is not detected, the BS can determine that there is an error in the downlink scheduling information.

In a pattern A5, the expected control signal is as in the third combination, and the expected uplink channel is a data channel. However, if a transmission error is detected in both the uplink and downlink scheduling information, similarly to a pattern B5, only the SR is actually transmitted through the uplink control channel.

Since the uplink channel expected by the BS is a data channel, the BS detects data on the data channel by using the DM-RS. Since no data is detected, the BS determines that there is a transmission error in uplink scheduling information, and tries to detect the ACK/NACK signal transmitted on the uplink control channel. Since the ACK/NACK signal is not detected, the BS determines that there is also a transmission error in the downlink scheduling information.

In a pattern A6, the expected control signal is as in the first combination, and the expected uplink channel is a data channel. However, if the transmission error is detected in both the uplink and downlink scheduling information, similarly to a pattern B6, no control signal is actually transmitted. The BS can detect a transmission error in scheduling information by using an error detection method for the patterns B4 and B5.

Table 3 below shows a pattern in which an error occurs only in the downlink scheduling information in a case where the BS transmits both the downlink scheduling information and the uplink scheduling information.

TABLE 3

| | pattern | A7 | A8 | A9 |
|---|---|---|---|---|
| A | ACK/NACK signal | ○ | ○ | ○ |
| | CQI | ○ | X | X |
| | SR | X | ○ | X |
| | Uplink Data | ○ | ○ | ○ |
| | Uplink Channel | Data Channel | Data Channel | Data Channel |

| | pattern | B7 | B8 | B9 |
|---|---|---|---|---|
| B | ACK/NACK signal | X | X | X |
| | CQI | ○ | X | X |
| | SR | X | ○ | X |
| | Uplink Data | ○ | ○ | ○ |
| | Uplink Channel | Data Channel | Data Channel | Data Channel |

Referring to Table. 3, patterns A7, A8, and A9 show expected control signals when there is no error in the downlink scheduling information and the uplink scheduling information. Therefore, the patterns A7, A8, and A9 are respectively equivalent to patterns A4, A5, and A6.

In case of the patterns A7, A8, and A9, for further accurate error detection, the BS can identify the ACK/NACK signal and the CQI according to locations of resource regions and sequences. When the UE transmits the ACK/NACK signal on the data channel, uplink shared resources and sequences implicitly related to downlink data are assigned and used. When the UE transmits the CQI on the data channel, unused uplink shared resources and sequences are assigned and used. Therefore, the BS can identify the ACK/NACK signal and the CQI.

First, in the pattern A7 and the pattern B7, the expected control signal is a second combination signal, but only the CQI is actually transmitted on the uplink data channel similarly to the pattern B4.

To detect the transmission error in the uplink and downlink scheduling information, the BS first detects the uplink data channel by using the DM-RS. Since uplink data is detected, the BS determines that there is no transmission error in the uplink scheduling information. If it is agreed between the UE and the BS that only the CQI is transmitted in case of the second combination, no error can be found in the pattern B7. Therefore, an agreement shall be made in which the ACK/NACK signal is transmitted prior to the CQI, which means CQI is dropped. To clarify this, whether to drop CQI or not (under the case of the simultaneous transmission of ACK/NACK signal and CQI) is configured by base station. If the CQI dropping option is configured (or enabled), CQI is dropped while only ACK/NACK signal is transmitted, otherwise CQI is transmitted with ACK/NACK signal at the same time.

The BS detects the ACK/NACK signal through DTX detection in a corresponding region. In this case, since the ACK/NACK signal cannot be detected in the DTX detection, the BS detects the ACK/NACK signal from the uplink control channel. The ACK/NACK signal is not detected from the uplink control channel either. Therefore, the BS can detect the transmission error in the downlink scheduling information.

Error detection of the pattern B9 can be performed in the same manner as error detection of the pattern B7.

Table 4 below shows a pattern in which an error occurs only in the uplink scheduling information in a case where the BS transmits both the downlink scheduling information and the uplink scheduling information.

TABLE 4

| | pattern | A10 | A11 | A12 |
|---|---|---|---|---|
| A | ACK/NACK signal | ○ | ○ | ○ |
| | CQI | ○ | X | X |
| | SR | X | ○ | X |
| | Uplink Data | ○ | ○ | ○ |
| | Uplink Channel | Data Channel | Data Channel | Data Channel |

| | pattern | B10 | B11 | B12 |
|---|---|---|---|---|
| B | ACK/NACK signal | ○ | ○ | ○ |
| | CQI | ○ | X | X |
| | SR | X | ○ | X |
| | Uplink Data | X | X | X |
| | Uplink Channel | Control Channel | Control Channel | Control Channel |

Referring to Table. 4, the BS expects to receive a control signal corresponding to a pattern A10 but receives a control signal corresponding to a pattern B10. First, the BS detects an uplink data channel by using the DM-RS. Since no uplink data is detected, the BS detects a reference signal for the ACK/NACK signal. Since no ACK/NACK signal is detected either, the BS determines that there is a transmission error in the uplink scheduling information.

Meanwhile, the BS detects the ACK/NACK signal from an uplink control channel. Since the ACK/NACK signal is detected, the BS determines that the downlink scheduling information is transmitted without errors.

Similarly, for a pattern B11 and a pattern B12, errors can be detected when the uplink scheduling information is transmitted.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of transmitting data in a wireless communication system, the method comprising:

transmitting, by a base station (BS), downlink scheduling information regarding downlink radio resource allocation and uplink scheduling information regarding uplink radio resource allocation to a user equipment (UE) on a downlink control channel, the uplink scheduling information including a downlink transmission indicator indicating whether the downlink scheduling information is transmitted or not;

transmitting, by the BS, downlink data to the UE on a downlink data channel based on the downlink scheduling information;

detecting, by the BS, a first transmission error in the uplink scheduling information by determining whether expected control signals, including an acknowledgement (ACK)/negative-acknowledgement (NACK) signal corresponding to the downlink data, are detected from an uplink data channel based on the uplink scheduling information or not; and if the expected control signals are not detected from the uplink data channel, detecting, by the BS, a second transmission error in the downlink scheduling information by determining whether the expected control signals, including the ACK/NACK signal corresponding to the downlink data, are detected from an uplink control channel.

2. The method of claim 1, wherein the downlink control channel is a physical downlink control channel (PDCCH).

3. The method of claim 1, wherein the uplink data channel is a physical uplink shared channel (PUSCH).

4. The method of claim 1, wherein the uplink control channel is a physical uplink control channel (PUCCH).

5. The method of claim 1, wherein the uplink control signals including at least one of a channel quality indicator (CQI), a scheduling request (SR), and an uplink multiplexing information indicator indicating whether a plurality of uplink control signals are multiplexed or not.

6. The method of claim 1, wherein the first transmission error or the second transmission error is detected by performing discontinuous transmission (DTX) detection on a reference signal for the uplink control signals.

7. The method of claim 1, wherein the uplink control signals use fixed resources including at least one of a location of an uplink subframe, a location of a frequency resource, and a location of a single carrier frequency division multiple access (SC-FDMA) symbol.

* * * * *